April 5, 1960 M. N. WEBER 2,931,638
WEIGHING DEVICE FOR LOADED VEHICLE
Filed July 14, 1954
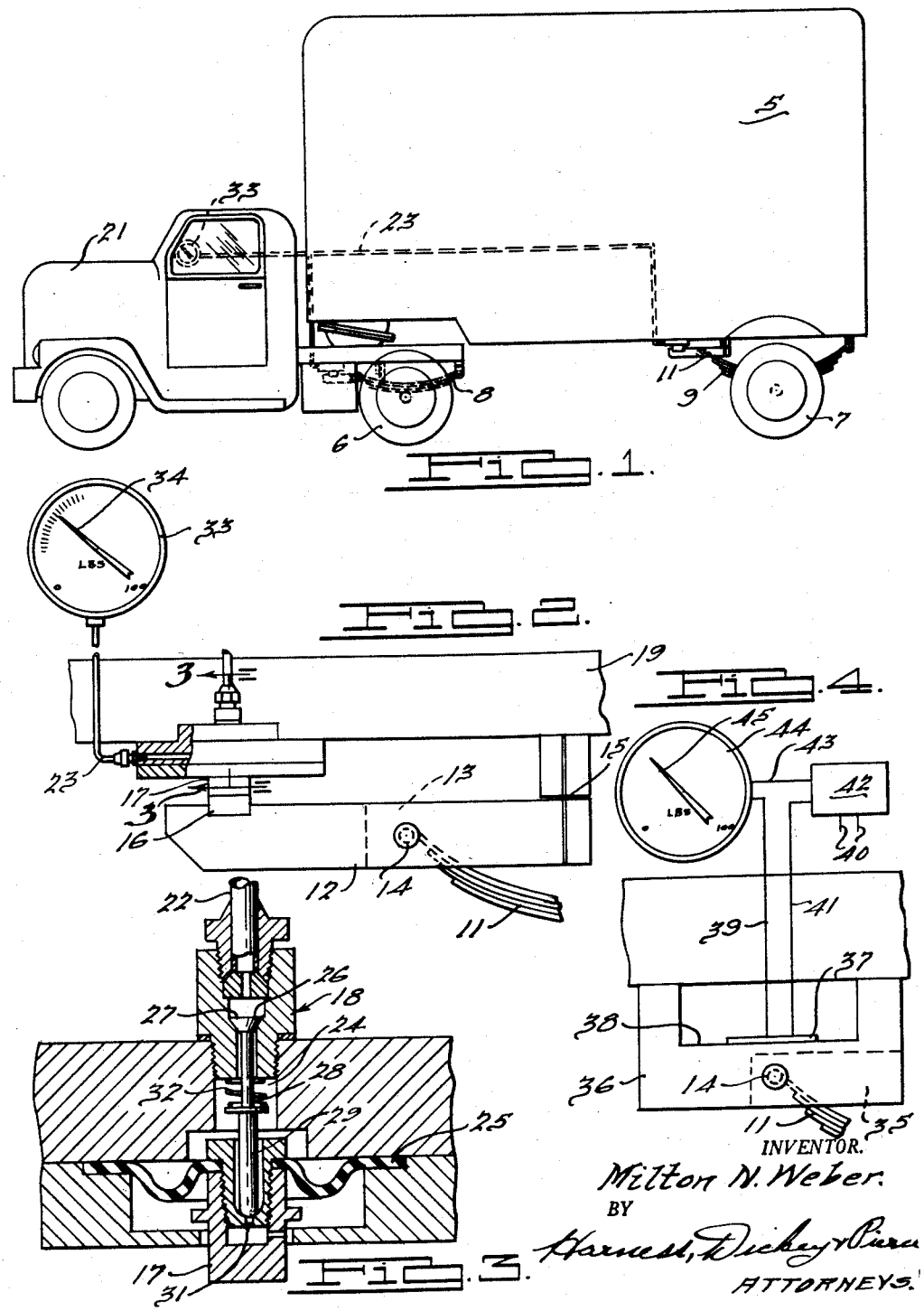
INVENTOR.
Milton N. Weber.
BY
Harness, Dickey & Pierce
ATTORNEYS.

United States Patent Office 2,931,638
Patented Apr. 5, 1960

2,931,638

WEIGHING DEVICE FOR LOADED VEHICLE

Milton N. Weber, Detroit, Mich., assignor to Weber Instrument Corporation, Detroit, Mich., a corporation of Michigan Application July 14, 1954, Serial No. 443,213

4 Claims. (Cl. 265—40)

This invention relates to load measuring devices including those for automotive vehicles, and particularly to a device which directly measures a load carried by the vehicle springs.

In the Milton N. Weber Patent No. 2,613,925, issued October 14, 1952, and assigned to the assignee of the present invention, a load sensitive fluid responsive device is illustrated employed for accurately weighing a load. The device consists of a valve mechanism having an air inlet and outlet conduit connected thereto controlled in such manner that the application of a load to the device changes the position of the valve structure thereof in a manner to cause a corresponding change of fluid pressure, greater or smaller, as the case may be, resulting in a change of pressure in the outlet conduit.

In the present arrangement, an end of the leaf springs of a vehicle is connected to levers one end of which is supported on a fulcrum the opposite end of which engages the load sensitive device. The ratio between the distance between the fulcrum point and the load applying point and the load applying point and the load sensitive device is employed when calibrating a scale to read directly in pounds the combined pressure of the sensitive devices. One of the devices is applied to an end of each of the springs on the front and rear wheels of the vehicle or the tractor and trailer thereof, and the scale is set to read zero when the body is unloaded. As the load is built up on the platform of the body, the weight thereof is accurately recorded upon the dial of the gauge so that at all times the weight being carried by the platform is ascertainable. The device in no way interferes with the springing of the body on the wheels and is extremely sensitive for measuring the load within the body.

Accordingly, the main objects of the invention are: to apply a load sensitive device to one end of each of the springs on a vehicle body to accurately gauge the weight of the carried load; to apply fulcrumed bars to the body having one end of the supporting springs connected thereto so that a load applied to the springs through the bars may affect load sensitive devices connected to the bar; to provide a gauge for measuring a load within a vehicle body directly in pounds actuated by load sensitive devices on one end of each of the springs which support the body, and, in general, to provide a measuring device for a load in a vehicle body which is simple in construction, positive of operation and economical of manufacture.

Other objects and features of novelty of the invention will be specifically pointed out or will become apparent when referring, for a better understanding of the invention, to the following description taken in conjunction with the accompanying drawing, wherein:

Figure 1 is a view in elevation of a tractor and trailer having a load weighing device provided thereon;

Fig. 2 is an enlarged, broken sectional view of a portion of the structure illustrated in Fig. 1;

Fig. 3 is an enlarged sectional view of the structure illustrated in Fig. 2, taken on the line 3—3 thereof, and Fig. 4 is a view of structure, similar to that illustrated in Fig. 2, showing another form thereof.

Referring to Figs. 1, 2 and 3, a body or trailer 5 is mounted on a front pair of wheels 6 and a rear pair of wheels 7 by leaf springs 8 and 9 provided at the four corners of the body. One end 11 of each leaf spring is attached to a lever bar 12, the rear portion of the bar containing a slot 13 through which the spring end extends and is secured on a pivot pin 14. Flexible straps 15 are attached to the spaced ends of the lever bar 12 to form a fulcrum about which the bar may pivot. The forward end of the bar contains a hardened block 16 which engages a plunger 17 within a load sensitive device 18 supported on a frame member 19 of either the tractor 21 or the trailer 5 of the vehicle.

The pressure sensitive device is similar to the one of the above mentioned patent, having an intake conduit 22 and an outlet conduit 23 connected thereto. The plunger 17 is sealed from an air chamber 24 by a diaphragm 25, the chamber being open to the passage of fluid from the inlet conduit 22 through a valve 26 and to the outlet conduit 23. A valve head 27 is mounted on a stem 28 having an enlarged end 29 capable of sealing a discharge opening 31 when in stable position or when raising the valve head 27 from its seat. A spring 32 about the stem 28 urges the head 27 upon its seat. In the position as illustrated in Fig. 3, a balanced condition exists wherein a predetermined pressure is provided within the fluid chamber 24 so that a predetermined pressure will be applied to a gauge 33 to have an indicating hand 34 thereon register a load within the vehicle directly in pounds.

As additional load is applied to the platform of the body of the trailer 5, the plunger 17 will move inwardly of the chamber 24, thereby moving the stem 28 of the valve upwardly and unseating the head 27. As a result, fluid will be admitted through the intake conduit 22 into the chamber 24, the increased pressure of which will urge the plunger 17 outwardly until the valve head 27 is again seated and the parts are in stable position, as illustrated in Fig. 3. This additional pressure will be applied to the gauge 33, causing the indicating arm 34 to register the additional load which is applied to the platform of the trailer 5. When all or a portion of the load is removed from the body of the trailer 5, the pressure within the chamber 24 will cause the plunger 17 to be further moved outwardly, thereby separating the enlarged end 29 of the stem 28 from the end of the outlet passageway 31, causing the fluid within the chamber 24 to escape, and as the fluid escapes the plunger 17 moves inwardly an amount proportionate to the load removed, until the aperture 31 is closed by the end of the stem 29 and the reduction in pressure on the fluid trapped within the chamber 24 will register on the gauge 33, moving the indicating arm in a counterclockwise direction and providing a direct reading for the remaining load on the platform. Thus, as the load is added to or reduced within the body, a corresponding change in the position of the indicating arm 34 occurs and direct reading in pounds will be provided at all times for the load within the body.

In Fig. 4 a further form of the invention is illustrated, that wherein the ends 11 of each of the springs 8 and 9 at opposite sides of the vehicle are mounted on pins 14 within a slot 35 in a U-shaped block 36 which is secured by suitable means to the frame of the platform. A strain plate 37 is secured to the inner face 38 of the U-shaped block 36, having a pair of conductors 39 and 41 connected thereto, the opposite end of the conductor 41 being connected to an amplifier 42 which is joined by a conductor 43 to a meter 44. A supply circuit 40 is connected to the amplifier 42. The end of the conductor 39 is also connected to the meter so that the load carried by the ends of the springs may be measured due to the straining of the material of the strain plate 37. The change in the resistance to the passage of current through the plate 37 unbalances a Wheatstone bridge circuit within the amplifier and this change is amplified and recorded on the meter 44 having an indicating arm 45 which directly reads in pounds the load supported on the platform of the body.

In either of the arrangements, a circuit is provided which actuates a gauge to produce readings in pounds of the actual load which is applied to a platform or the floor of a vehicle body. Whether the medium is air, liquid, or electricity, the results are the same in accurately weighing an increase or decrease in the carried load.

What is claimed is:

1. In a gauging mechanism, a vehicle platform supporting a load from its four corners, fluid sensitive devices secured near each of the corners of said platform, fulcrumed lever bars secured near said corners engaging said devices, leaf springs adjacent each corner having one end engaging said lever bars and the other end engaging said platform, and gauging means responsive to the fluid pressure in the combined devices for indicating the weight of the load on said platform.

2. In a vehicle body for carrying a load, wheels for supporting said body, springs mounted between said body and said wheels, fulcrumed lever bars secured to said body to which one end of the springs is connected, fluid responsive load sensitive means on said body engaged by said bars, conduit means in which the fluid from the fluid responsive devices exerts a combined pressure, and indicating means connected to said conduit means for designating a change of load in the combined load sensitive means for providing weight indication of the load within the body.

3. In a vehicle body for carrying a load, wheels for supporting said body, springs mounted between said body and said wheels, fulcrumed lever bars secured to said body to which the springs are connected, load sensitive means on said body engaged by said bars, and means indicating a change of load in the combined load sensitive means for providing weight indication of the load within the body, said load sensitive means being fluid pressure responsive mechanisms and indicating means being a gauge which is responsive to the combined pressure of said mechanisms.

4. In a vehicle body supported on spring means at the corners thereof, lever bars fulcrumed near the corners of the body to which the spring means is attached, fluid sensitive devices supported near the corners of the body in engagement with said lever bars, said devices having a chamber to which air is admitted and expelled, a single pressure responsive gauge connected to all of said chambers for recording the combined fluid pressure thereof, and means within said devices for admitting air into the chamber when additional load is applied to the body and for expelling air therefrom when the load is removed therefrom to have the pressure of air within the chambers vary with a change of load within the body so that the gauge accurately provides visual indication of the load.

References Cited in the file of this patent

UNITED STATES PATENTS

| Number | Name | Date |
|---|---|---|
| 439,215 | Wanamaker | Oct. 28, 1890 |
| 439,217 | Wanamaker | Oct. 28, 1890 |
| 763,671 | Jepson | June 28, 1904 |
| 1,261,508 | Gamble | Apr. 2, 1918 |
| 1,339,779 | Mohler | May 11, 1920 |
| 1,491,081 | Cook et al. | Apr. 22, 1924 |
| 1,573,916 | Crisp | Feb. 23, 1926 |
| 1,581,211 | Hofmann | Apr. 20, 1926 |
| 1,877,980 | Schafer | Sept. 20, 1932 |
| 2,020,307 | Fitch | Nov. 12, 1935 |
| 2,499,033 | Oberholtzer | Feb. 28, 1950 |
| 2,613,925 | Weber | Oct. 14, 1952 |
| 2,634,968 | Weber | Apr. 14, 1953 |
| 2,668,702 | Belknap | Feb. 9, 1954 |
| 2,673,082 | Thurston | Mar. 23, 1954 |